May 20, 1947.  H. K. WALDES  2,420,921
RETAINING RING
Filed June 27, 1945
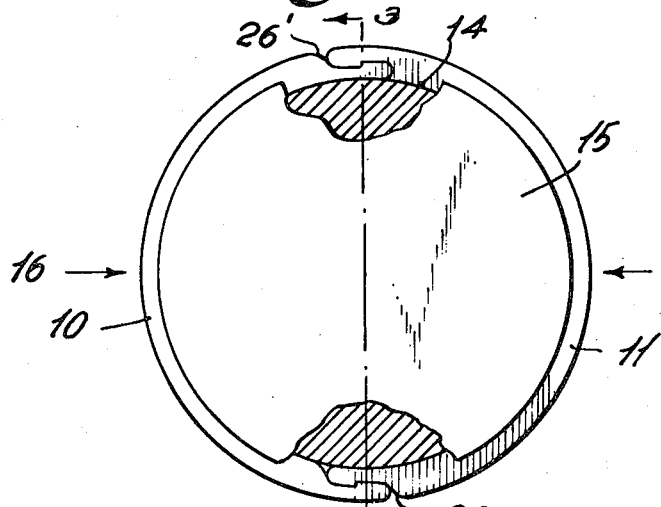
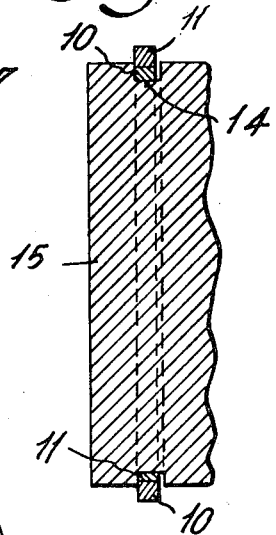
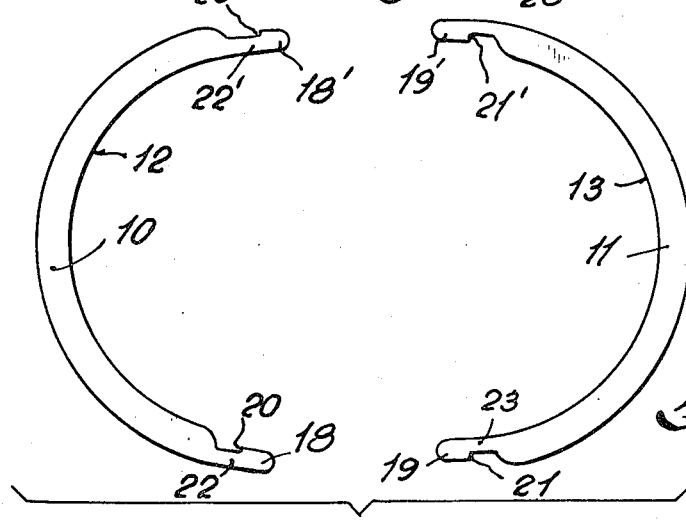
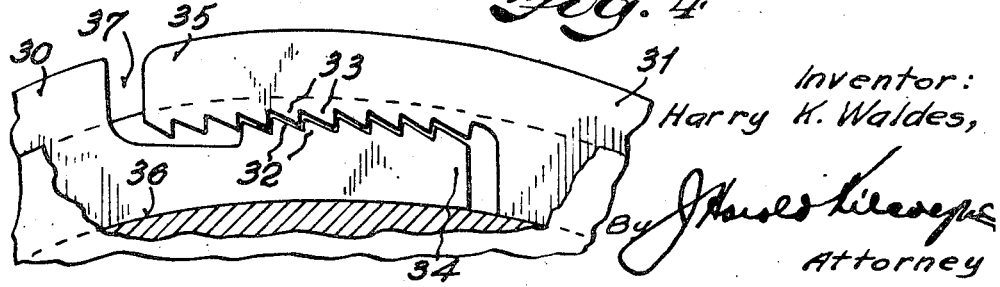
Inventor:
Harry K. Waldes,
Attorney Patented May 20, 1947

2,420,921

UNITED STATES PATENT OFFICE 2,420,921

RETAINING RING

Harry K. Waldes, Jackson Heights, N. Y., assignor to Waldes Koh-I-Noor, Inc., Long Island City, N. Y., a corporation of New York Application June 27, 1945, Serial No. 601,746

6 Claims. (Cl. 85—8.5)

This invention relates to improvements in retaining rings of the so-called external type which, when inserted in a groove provided therefor in a shaft or the like, are adapted to provide an artificial shaft shoulder for locating and securing machine parts, for example gears, bearing races and the like, against axial displacements relative to the shaft.

As usually constructed, external retaining rings conventionally take the form of an open-ended spring ring having a relatively narrow gap between the open ends thereof. In assembly, such a nearly closed ring must of necessity be spread over the end of a shaft and shifted axially therealong to the plane of a seating groove provided therefor in the shaft, being thereupon released to seat against the groove bottom under spring action inherent in the ring.

It follows that the conventional nearly closed rings are limited in their application by the requirement of a free shaft end and an unobstructed length of shaft between the shaft end and the seating groove, such being necessary to maintain the rings within elasticity limits and at the same time to retain in the rings sufficient resiliency to insure gripping power when seated in their groove.

While the so-called open-type retaining rings, i. e. rings whose arcuate length is only slightly greater than 180° so that they can be spread sideways over the shaft in the plane of the seating groove, are also known, they are also limited in their application due to their lack of resistance against large thrust loads consequent to the large gap between their free ends, which in turn results in the ring forming an incomplete and unbalanced shoulder having a correspondingly decreased gripping power.

It is one aim of the present invention to combine the simple and quick assembly operation characterizing the so-called open retaining ring which can be inserted sideways over shafts and the like, with the gripping power and increased thrust load resistance of nearly closed retaining rings which are not capable of such simple assembly.

It is a further feature of this invention that, as compared with either the known nearly-closed and open forms of retaining rings, the spreading motion on assembly or disassembly of the present improved rings is reduced considerably, thereby diminishing such limiting factors in respect to material specification as were necessary in the known rings to compromise between breakage on assembly and permanent deformation after assembly.

The present invention also aims to provide a spring retaining ring of the external type which, when inserted in its groove, is securely locked against opening under the variety of forces acting on it, and particularly under friction forces exerted on the ring by a relatively rotating machine part.

The invention moreover aims to provide a novel and improved external ring capable of forming a complete ring annulus about its shaft and which is accordingly perfectly balanced, but which is nevertheless capable of being inserted in its seating groove sideways or crosswise to the center line of the shaft and in the plane of its seating groove by a simple and quick assembly operation.

In its more specific aspects the invention proposes an effective and thoroughly dependable multi-part retaining ring which is constituted by identical ring parts capable of being formed complete in a simple punching operation in a single press, for example, the identical formation of the ring parts permitting their inexpensive manufacture and production on a quantity basis, and providing also for simple handling and rapid assembly in a shaft groove.

The above and other objects are achieved according to the present invention through the provision of a retaining ring formed as two or more ring parts or segments of identical construction, adapted to form a complete ring circle when fitted together. The ends of each of such parts are formed with locking means, for example, hooks, which are adapted to interengage and complement the locking means (hooks) of the other ring part or parts in assembly to their full ring formation. By providing the ring parts with a diameter corresponding substantially to that of the groove bottom, the improved ring is capable of ready assembly within its groove by the simple expedient of positioning the ring parts to the sides of the shaft and in the plane of the shaft groove, and fitting them together so that their locking means interengage and secure the ring parts together as a complete ring annulus having pressure fit against the bottom of the groove. The ends of the rings are of course so dimensioned that the section height of interengaged ring ends does not exceed the section height of the ring parts proper, with the result that the assembled ring forms a substantially smooth and continuous shoulder on the shaft. To insure self-locking of the ring against opening, even under high friction forces normally tending to open the same, the locking means of the ring parts are oppositely disposed, that is to say, the hook or equivalent locking means at one end of a ring part is inwardly disposed whereas the hook on the other end of said part is outwardly disposed. Hence, by up-ending or turning one ring part relative to another part, the related hooks of two adjacent ring parts employed in forming a full ring are adapted to complement and lock with each other in assembly in such manner that unintentional or accidental opening of the ring is precluded.

In the drawings—

Fig. 1 is a plan view, partly in section, illustrating a two-part external retaining ring according to the invention seated in its shaft groove;

Fig. 2 is an enlarged view of the two ring parts forming the ring shown in Fig. 1 in their separated relation;

Fig. 3 is a side elevation of a shaft and ring as shown in Fig. 1, the view being partly sectioned along a line corresponding to line 3—3 of Fig. 1; and Fig. 4 is a partial view of a shaft and ring assembly illustrating a modified form of ring part locking means.

A ring according to the invention comprises, for example, two identical ring parts 10 and 11 formed of spring material, having inner circular edges 12 and 13, respectively, of diameter corresponding substantially to the diameter of the bottom of a ring seating groove 14 provided in shaft 15. As shown, each ring part is in the form of a semi-circle so that when the two ring parts 10 and 11 are brought together in crosswise direction relative to the centerline of shaft 15, they form a complete ring annulus. Upon assembly of the ring parts within the groove 14, it will be understood that they secure themselves together and provide an artificial shoulder on the shaft for locating and securing machine parts such as gears, bearing races and the like against axial displacements.

To secure the ring parts together as aforesaid, the ends of the parts according to the Figs. 1–3 modification are formed as specially shaped "hooks," as the term is herein used in its broad sense, which function in such manner that related hooks, i. e. the two adjacent upper and the two adjacent lower hooks of the parts, interengage and complement each other as said parts are brought together to form a complete ring annulus. According to the aforesaid special shaping, the ends of the ring part 10 are formed with reduced section height corresponding to about one-half that of the ring part proper, and terminate in rounded heads 18, 18'. Rearwardly of each rounded head the ring part is sharply angled as at 20, 20', each angled edge forming in effect the barb of a hook of which the adjacent head provides the hook body. It will be observed that the upper hook of the ring part 10 is directed outwardly whereas the lower hook is directed inwardly of the ring part.

Considering now the identical part ring 11, such is provided at its terminal portions with rounded heads 19, 19', the section height of which corresponds to that of the rounded heads 18, 18' of the ring part 10, being substantially equal to one-half of the section height of the ring part proper. Rearwardly thereof, the ring ends are sharply angled as at 21, 21', thus to provide hooks identical with the hooks of the ring part 10. In the case of the ring part 11, however, the upper hook thereof is inwardly directed, whereas the lower hook is outwardly directed, this reversal of hook disposition relative to that of ring part 10 being simply effected by up-ending or turning ring part 11 180° relative to ring part 10. Thus, the related upper and lower hooks of the ring parts are adapted to interengage with and complement each other as the ring parts are assembled to form a complete ring annulus.

It will be observed that as the ring parts are forced together in the direction of the arrows 16, 17 (Fig. 1), some spreading of the ring ends occurs, since the outer of each pair of adjacent hooks thereof must clear or ride over the adjacent inner hook. This spreading of the ring ends is utilized by the present invention to effect closing of the ring parts with a snap action and also to insure that the section height of interengaged hooks is contained within the section height of the assembled ring. To this end the ring part 10 is provided with recesses disposed rearwardly of the end heads 18, 18' thereof, for the purpose of seating the heads or hooked ends of the related ring part 11. Such recesses are formed by providing narrow neck portions 22, 22' which connect the heads 18, 18' respectively with the ring part proper, the length and width of the neck portions being such that they define seating recesses for the heads 19, 19' of the ring part 11 and contain the latter with the section height of both ring parts proper. As the ring part 11 is identically formed, it too is provided with narrow neck portions 23, 23' connecting the heads 19, 19' with the ring part proper and defining recesses for seating the heads 18, 18' of the ring part 10. Hence, as the ring parts are brought together in assembly, the hooked ends thereof are spread slightly, and thereupon the hooks close or interengage with a snap action, the special recessing moreover insuring that the hooks complement each other in the manner shown in Fig. 1 as to section height. That is so say, the mated or interengaged hooks have a total section height which corresponds to the section height of the ring parts proper and thus the assembled ring forms a substantially smooth and continuous shoulder throughout its full periphery.

It is a feature of the present invention that the identical ring parts 10 and 11 can be formed complete in a simple punching-out operation employing a single punch and die. The assembly of ring parts as aforesaid is essentially simple, and may be effected by disposing two such ring parts to the sides of the shaft and in the plane of the ring groove, and thereupon bringing the ring parts together in seating relation within the groove. During such movement, the related hook ends of the parts ride over each other and thereupon interlock with a snap action. To disassemble the complete ring formed by the ring parts assembled as in the foregoing it is only necessary to force a bladed tool, for example a screw driver, into either of the small gaps 26, 26' resulting from the rounded head formation of the ring part ends, and to raise the relatively upper hook from the relatively lower hook of an interengaged pair, whereupon the ring parts fall apart or may be readily spread apart.

Referring to Fig. 4, wherein is illustrated a modified locking means according to the invention, the ring parts 30, 31 correspond to the previously described ring parts 10, 11 both as to construction and inner diameter. However, instead of the locking means at the ends being in the form of hooks, as previously described, such locking means are provided by a plurality of radially interengaging teeth 32, 33, respectively, which ratchet with each other as the ring parts are brought together from positions sideways of the shaft 35. Preferably the teeth are arranged on a curve concentric with the ring center as shown, and by providing lesser depth in the under head 34 than in the outer head 35, the teeth formed along adjacent edges thereof can be disposed or contained within the shaft groove 36.

as indicated by the dotted line continuation of the outer shaft line in Fig. 4.

By providing a greater number of teeth on the head portion of one ring end, for example the relatively outer head 35 of ring part 31, an angled gap 37 is provided for the insertion of a suitable tool for uncoupling the ring parts for disassembly purposes. The greater number of teeth 33 on the head 35 also facilitates closing of the ring parts 30, 31 as it in effect increases the interlocking range, so that the ring parts may be engaged but loosely held together by the teeth before being forced together to their final position.

It will be observed from the above that the improved ring construction as herein proposed combines the quick assembly advantages of the known open form of retaining ring in that the ring parts can be brought together and finally assembled directly in the plane of the seating groove, with the substantially greater gripping power and increased thrust load resistance of the prior nearly closed rings. Moreover, as compared with the known retaining rings, spreading of the ring parts in their assembly and disassembly is reduced to a minimum, and hence the danger of impairing the effectiveness of the ring due to excessive spreading thereof is effectively overcome.

Inasmuch as the multi-part ring according to both illustrated forms of the invention provides upon assembly a complete ring annulus, the assembled ring is perfectly balanced and hence can be used without danger on shafts rotating at high speeds. Due to the opposite relation of the hooked or toothed ends of the ring parts and the manner in which they interengage and complement one another, the assembled ring is locked against either accidental opening or opening likely to occur under friction forces exerted against the side faces thereof by a relatively rotating machine part, for example.

As many changes could be made in carrying out the above constructions without departing from the scope of the invention, it is intended that all matter contained in the above description or shown in the accompanying drawings shall be interpreted as illustrative and not in a limiting sense.

I claim:

1. A retaining ring for forming an artificial shoulder on a shaft or the like provided with a ring seating groove comprising identical ring parts of spring material adapted for assembly within the groove by being forced together in a direction crosswise of the center line of the shaft, each ring part having an inner edge diameter corresponding substantially to the diameter of the groove bottom, and the adjacent ends of the parts being formed to provide complemental locking means which are adapted to clear one another by relative radial movement thereof in the assembly of the ring parts and thereupon to interlock and secure the ring parts together as a complete ring annulus having pressure fit against the bottom of the groove.

2. A retaining ring for forming an artificial shoulder on a shaft or the like provided with a ring seating groove comprising identical ring parts of spring material adapted for assembly within the groove by being forced together in a direction crosswise of the center line of the shaft, each ring part having an inner edge diameter corresponding substantially to the diameter of the groove bottom, the adjacent ends of the parts being formed to provide complemental inner and outer locking means, of which the outer locking means is operative to ride radially outwardly over the inner locking means in the assembly of the ring parts and thereupon to interlock and secure the ring parts together as a complete ring annulus having pressure fit against the bottom of the groove.

3. A retaining ring for forming an artificial shoulder on a shaft or the like provided with a ring seating groove comprising two identically shaped and substantially semi-circular ring parts of spring material adapted for assembly within the groove by being forced together crosswise of the center line of the shaft, each ring part having an inner edge diameter corresponding substantially to the diameter of the groove bottom, the adjacent ends of the parts terminating in a rounded head having a sharply angled rear edge and being connected to the ring part proper by a neck portion, the head and its angled rear edge of one adjacent end forming an outwardly directed hook and the head and its angled rear edge of the other adjacent end forming a complemental inwardly directed hook which is adapted to ride over the outwardly directed hook in the assembly of the ring parts and thereupon to interlock with the outwardly directed hook, whereby to secure the ring parts together as a complete ring annulus having pressure fit against the bottom of the groove.

4. A retaining ring as set forth in claim 3, wherein the section height of the rounded heads is approximately half the section height of the ring parts proper and the section height of the necks is such as to provide head seating recesses of the depth necessary to contain the interlocked heads within the section height of the ring parts.

5. A retaining ring for forming an artificial shoulder on a shaft or the like provided with a ring seating groove comprising identical ring parts of spring material adapted for assembly within the groove by being forced together in a direction crosswise of the center line of the shaft, each ring part having an inner edge diameter corresponding substantially to the diameter of the groove bottom, the adjacent ends of the parts being formed with a series of radial teeth which in the assembly of the parts interengage and coact to secure the ring parts together as a complete ring annulus having pressure fit against the groove bottom.

6. A retaining ring as forth in claim 5, wherein the teeth of one adjacent end of ring parts are arranged along a circular curve concentric to the ring center and protrude to the inside of the ring, and the corresponding teeth of the adjacent end of the ring parts are also arranged along a circular line concentric to the ring center and protrude to the outside of the ring.

HARRY K. WALDES.

REFERENCES CITED

The following references are of record in the file of this patent:

UNITED STATES PATENTS

| Number | Name | Date |
| --- | --- | --- |
| 1,652,272 | Dawson | Dec. 13, 1927 |
| 838,976 | George | Dec. 18, 1906 |

FOREIGN PATENTS

| Number | Country | Date |
| --- | --- | --- |
| 12,708 | Great Britain | June 3, 1907 |